US006768450B1

(12) United States Patent (10) Patent No.: US 6,768,450 B1
Walters et al. (45) Date of Patent: Jul. 27, 2004

(54) SYSTEM AND METHOD FOR WIRELESSLY LINKING A GPS DEVICE AND A PORTABLE ELECTRONIC DEVICE

(75) Inventors: Thomas H. Walters, Gardner, KS (US); Ronald B. Kabler, Olathe, KS (US)

(73) Assignee: Garmin Ltd. (KY)

(*) Notice: Subject to any disclaimer, the term of this patent is extended or adjusted under 35 U.S.C. 154(b) by 0 days.

(21) Appl. No.: 10/289,666

(22) Filed: Nov. 7, 2002

(51) Int. Cl.[7] ............................................. H04B 7/85
(52) U.S. Cl. .............................. 342/357.09; 342/357.06
(58) Field of Search ................... 342/357.06, 357.09, 342/357.12; 701/213, 215

(56) References Cited

U.S. PATENT DOCUMENTS

| 3,063,048 A | 11/1962 | Lehan et al. |
| 4,445,118 A | 4/1984 | Taylor et al. |
| 4,884,132 A | 11/1989 | Morris et al. |
| 5,043,736 A | 8/1991 | Darnell et al. |
| 5,119,504 A | 6/1992 | Durboraw, III |

(List continued on next page.)

FOREIGN PATENT DOCUMENTS

| EP | 0123562 | 10/1984 |
| EP | 0242099 | 4/1987 |
| FR | 2541801 | 2/1983 |

OTHER PUBLICATIONS

Inoue et al., 2002/0169551 A1, Navigation system, handheld terminal, data transfer system and program executed therein, Nov. 14, 2002.

"Tendler Updates FoneFinder", Jun. 28, 1999 *Wireless Week*.

"Automatic Vehicle Monitoring" by J.S. Bravman et al., Fairchild Space & Electronics, Co., Germantown, MD.

"Application of the Global–Positioning System (GPS) to Automatic Vehicle Monitoring"—1981 Carnahan Conference on Crime Countermeasures, University of Kentucky, Lexington, May 13–15, 1981.

Tranchina et al., 2003/0080897 A1, Mobile Radio With GPS Capability.

"AX.25 Amateur Packet–Radio Link–Layer Protocol", Version 2.2, Nov. 1997 fom http://www.tapr.org.

APRS Guide—"The Automatic Position Reporting System", compiled from a series of articles by Arte Booten, from http://www.oarc. net.

Eshelman et al., 2003/0001742 A1, Electronic Assistant Incorporated In Personal Objects, Jan. 2, 2003.

U.S. patent application 10,268,859 entitled Apparatus System and Methods for Navigation Data Transfer Between Portable Devices, filed Oct. 10, 2002.

*Primary Examiner*—Dao Phan
(74) *Attorney, Agent, or Firm*—Devon A. Rolf

(57) ABSTRACT

A system and method for wirelessly linking a GPS device (12) with a portable electronic device (14) to provide the portable electronic device (14) with GPS functions. The GPS device (12) includes a GPS receiver or sensor (16) operable for receiving GPS satellite signals from a plurality of GPS satellites and a transmitter (18) coupled with the GPS receiver for wirelessly transmitting information corresponding to the GPS satellite signals. The portable electronic device (14) includes a receiver for wirelessly receiving the information transmitted by the GPS device (12) and a display for displaying data corresponding to the GPS satellite signals. The transmitter (18) of the GPS device (12) and the receiver of the portable electronic device (14) preferably wirelessly transmit and receive information via a short range wireless local area network (LAN) using infrared, unlicensed radio, or optical transmission methods.

30 Claims, 3 Drawing Sheets

U.S. PATENT DOCUMENTS

| | | | |
|---|---|---|---|
| 5,208,756 A | 5/1993 | Song | |
| 5,223,844 A | 6/1993 | Mansell et al. | |
| 5,235,633 A | 8/1993 | Dennison et al. | |
| 5,301,368 A | 4/1994 | Hirata | |
| 5,334,974 A | 8/1994 | Simms et al. | |
| 5,345,244 A * | 9/1994 | Gildea et al. | 342/357 |
| 5,355,511 A | 10/1994 | Hatano et al. | |
| 5,364,093 A | 11/1994 | Huston et al. | |
| 5,365,450 A | 11/1994 | Schuchman et al. | |
| 5,379,224 A | 1/1995 | Brown et al. | |
| 5,389,934 A | 2/1995 | Kass | |
| 5,408,238 A | 4/1995 | Smith | |
| 5,414,432 A | 5/1995 | Penny et al. | |
| 5,434,789 A | 7/1995 | Fraker et al. | |
| 5,448,773 A | 9/1995 | McBurney et al. | |
| 5,469,175 A | 11/1995 | Boman | |
| 5,506,587 A | 4/1996 | Lans | |
| 5,539,398 A | 7/1996 | Hall et al. | |
| 5,555,286 A | 9/1996 | Tendler | |
| 5,570,095 A | 10/1996 | Drouilhet et al. | |
| 5,650,770 A | 7/1997 | Schlager et al. | |
| 5,689,269 A | 11/1997 | Norris | |
| 5,689,809 A | 11/1997 | Grube et al. | |
| 5,712,899 A | 1/1998 | Pace, II | |
| 5,781,150 A | 7/1998 | Norris | |
| 5,786,789 A | 7/1998 | Janky | |
| 5,804,810 A | 9/1998 | Woolley et al. | 235/492 |
| 5,826,195 A | 10/1998 | Westerlage et al. | |
| 5,848,373 A | 12/1998 | DeLorme et al. | |
| 5,877,724 A | 3/1999 | Davis | 342/357 |
| 5,890,070 A | 3/1999 | Hamada | 455/524 |
| 5,892,441 A | 4/1999 | Woolley et al. | 340/539 |
| 5,914,675 A | 6/1999 | Tognazzini | |
| 5,929,752 A | 7/1999 | Janky et al. | |
| 5,952,959 A | 9/1999 | Norris | |
| 5,963,130 A | 10/1999 | Schlager et al. | |
| 6,002,982 A | 12/1999 | Fry | |
| 6,005,513 A * | 12/1999 | Hardesty | 342/357.09 |
| 6,011,510 A | 1/2000 | Yee et al. | |
| 6,046,688 A * | 4/2000 | Higashikata et al. | 340/995 |
| 6,085,090 A | 7/2000 | Yee et al. | |
| 6,111,539 A | 8/2000 | Mannings et al. | |
| 6,124,826 A * | 9/2000 | Garthwaite et al. | 342/357.09 |
| 6,144,336 A | 11/2000 | Preston et al. | |
| 6,148,262 A | 11/2000 | Fry | |
| 6,166,626 A | 12/2000 | Janky et al. | |
| 6,182,006 B1 | 1/2001 | Meek | |
| 6,236,338 B1 | 5/2001 | Hamada | 340/995 |
| 6,240,275 B1 | 5/2001 | Camp, Jr. | |
| 6,246,376 B1 | 6/2001 | Bork et al. | 343/760 |
| 6,275,707 B1 | 8/2001 | Reed et al. | 455/456 |
| 6,278,402 B1 | 8/2001 | Pippin | |
| 6,295,449 B1 | 9/2001 | Westerlage et al. | |
| 6,373,430 B1 | 4/2002 | Beason et al. | |
| 6,374,179 B1 | 4/2002 | Smith et al. | 701/207 |
| 6,389,291 B1 | 5/2002 | Pande et al. | 455/456 |
| 6,421,608 B1 | 7/2002 | Motoyama et al. | 701/213 |
| 6,456,938 B1 | 9/2002 | Barnard | |
| 6,492,941 B1 * | 12/2002 | Beason et al. | 342/357.1 |
| 6,518,919 B1 * | 2/2003 | Durst et al. | 342/357.07 |
| 6,529,824 B1 | 3/2003 | Obradovich et al. | |

* cited by examiner

SYSTEM AND METHOD FOR WIRELESSLY LINKING A GPS DEVICE AND A PORTABLE ELECTRONIC DEVICE

BACKGROUND OF THE INVENTION

1. Field of the Invention

The present invention relates to navigation devices such as GPS receivers. More particularly, the invention relates to a system and method for wirelessly linking a GPS device with a portable electronic device to provide the portable electronic device with GPS functions.

2. Description of the Prior Art

The global positioning system (GPS) is an electronic satellite navigation system which permits users to determine their position with respect to the Earth. GPS receivers and other navigational devices continue to grow in popularity and are used in many applications, including recreational activities and automobile and marine navigation.

GPS receivers detect and decode signals from a number of satellites orbiting the Earth. The signals from each of these satellites indicate the position of the satellite and the time at which the signals were sent. To decode the satellite signals, known as spread spectrum signals, and thereby calculate desired position and navigational data, a GPS receiver must first "find" or acquire the signals emitted from a minimum number of satellites. Once the receiver is "locked on" to the spread spectrum signals, the user's global position and other navigational data (e.g., velocity of movement) can be calculated.

A typical GPS unit includes (along with other components) a GPS receiver which receives the satellite signals, resident memory in which cartographic data and other location information may be stored, a processor and associated GPS software for determining the location of the unit as a function of the received satellite signals and for accessing and processing data and information in the memory, and a display for displaying the information along with an indication of the unit's location. The resident memory may be integral with the processor, memory chips coupled with the processor, or may include plug-in memory modules that fit within corresponding memory slots in the receiver. The processor retrieves information from the memory, for example, to display maps and routing instructions to permit a user of the GPS receiver to navigate to a desired location.

Portable electronic devices such as cellular telephones, personal digital assistants (PDAs), portable computers, and short range radios, also remain popular. Many GPS users often carry one or more of these portable electronic devices along with a GPS receiver so that they can communicate with others or perform other activities provided by the portable electronic device while navigating with the GPS receiver. Unfortunately, carrying and using multiple devices can be cumbersome, especially while driving, hiking, or performing other activities requiring mental concentration or physical exertion.

In recent years, attempts have been made to combine GPS receivers and other types of portable electronic devices to lessen the number of devices that need to be carried and used. For example, many PDAs and cellular phones now come equipped with onboard GPS receivers so that the location of the PDA or phone may be determined and displayed along with other information. Unfortunately, such combined devices are relatively expensive and complicated to use. Many people are therefore reluctant to purchase such combined units because they may rarely need to use the GPS functions and do not want their PDA or phone cluttered with controls for rarely-used functions. Moreover, such combined units require that some of the processing power normally reserved for the cellular phone or PDA be used for GPS functions, thus requiring either more memory and more powerful processors or longer processing times. Another limitation of such combined units is that they only combine GPS functions with a cellular phone or PDA, and not with many other types of portable electronic devices.

To alleviate some of these concerns, PDAs and cell phones have been introduced with expansion slots for receiving plug-in GPS receiver modules. The plug-in modules may be inserted into the PDA or phone whenever GPS functions are desired and then removed when not in use. Unfortunately, such plug-in GPS receiver modules are also cumbersome because they require the user to handle and connect two separate devices. Moreover, plug-in GPS receiver modules are not as accurate in determining geographic positioning as dedicated GPS receivers. Another limitation of such plug-in GPS receiver modules is that they are currently designed only for use with PDAs and cellular phones, and not with many other types of portable electronic devices. Moreover, use of these plug-in modules prevents the use of other types of plug-in modules such as expansion memory cards.

Therefore, a need exists for a system and/or method for providing GPS functionalities to portable electronic devices without using expensive and complicated combined units and without requiring the use of plug-in GPS receiver modules.

SUMMARY OF THE INVENTION

The present invention solves the above-described problems and provides a distinct advance in the art of GPS devices and portable electronic devices. More particularly, the present invention provides a navigation system and method for wirelessly linking a GPS device with any portable electronic device to provide GPS functions to the portable electronic device without using expensive and complicated combined units and without requiring the use of plug-in GPS receiver modules.

A first embodiment of the navigation system broadly includes a GPS device and a portable electronic device that wirelessly communicate over a short range local area network (LAN). The GPS device in the first embodiment preferably includes a GPS receiver or sensor operable for receiving GPS satellite signals from a plurality of GPS satellites and a transmitter coupled with the GPS receiver for wirelessly transmitting information corresponding to the GPS satellite signals. Importantly, the GPS device does not require a display for displaying location information nor even a processor for determining a location of the device. Rather, the GPS receiver and transmitter may merely receive GPS satellite signals and transmit information relating thereto. This permits the use of a small GPS device which may be worn by a user or clipped on a visor or dash of an automobile or other object.

The portable electronic device of the first embodiment includes a receiver for wirelessly receiving the information transmitted by the GPS device and a display for displaying data corresponding to the GPS satellite signals. The portable electronic device also preferably includes a processor and conventional GPS software applications for analyzing the information transmitted by the GPS device and for determining a location of the GPS device as a function thereof. The portable electronic device may also include a user interface and other components conventionally found on cellular phones, PDAs, portable computers, short range radios, and other electronic devices.

A second embodiment of the navigation system also broadly includes a GPS device and a portable electronic device that wirelessly communicate over a short range LAN. The GPS device in the second embodiment preferably includes the GPS receiver and transmitter discussed above plus a processor, associated memory, and GPS software for analyzing the GPS satellite signals, determining a location of the GPS device as a function thereof and creating corresponding location information. The transmitter of the GPS device then transmits the location information to the portable electronic device.

The portable electronic device of the second embodiment is similar to the portable electronic device 14 of the first embodiment except that it requires no processor and GPS software for analyzing the GPS satellite signals. Instead, the portable electronic device merely displays data corresponding to the location information created and transmitted by the GPS device. This permits the use of portable electronic devices without special GPS software and processing capabilities.

In both of the above-described embodiments, the transmitter of the GPS device and the receiver of the portable electronic device preferably transmit and receive the information via a short range wireless LAN using short range radio, infrared, or optical transmission methods. In preferred forms, the transmitter and receiver transmit and receive the information using BlueTooth or WiFi communication protocols.

In both embodiments, the GPS device may periodically and automatically transmit the information to the portable electronic device so that the portable electronic device may periodically update the displayed location of the GPS device, or the portable electronic device may periodically poll the GPS device for the information. The time period between updates may be fixed or may be selected by a user. A user of the portable electronic device may also request transmission of updated location information from the GPS device.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
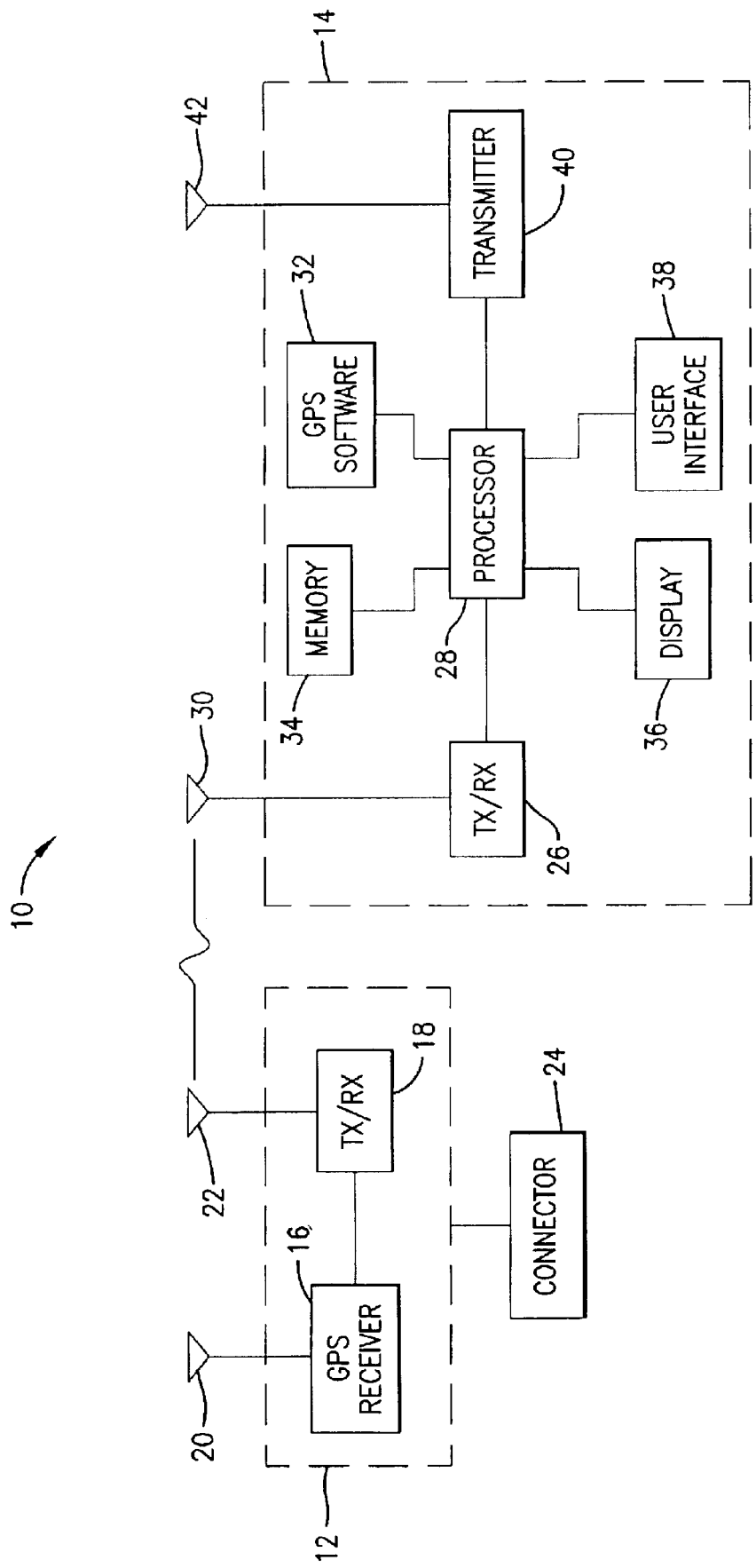
FIG. 1 is a block diagram of a navigation system constructed in accordance with a first preferred embodiment of the present invention.

Turning now to the drawing figures, and particularly FIG. 1, a navigation system constructed in accordance with a first preferred embodiment of the present invention is illustrated. The navigation system 10 broadly includes a GPS device 12 that wirelessly communications with a portable electronic device 14.

In the first embodiment of the invention, the GPS device 12 preferably includes a GPS receiver or sensor 16 and a transmitter 18. The GPS receiver 16 either includes a GPS antenna 20 or is coupled with an external GPS antenna and is operable for receiving GPS satellite signals from a plurality of GPS satellites and for delivering information corresponding to the GPS satellite signals to the transmitter 18.

The transmitter 18 is coupled with the GPS receiver 16 and is operable for wirelessly transmitting at least a portion of the information received by the GPS receiver 16. The transmitter 18 either includes an antenna 22 or may be coupled with an external antenna. The transmitter 18 is preferably a transceiver so that it may both transmit and receive information as described below.

The GPS receiver 16 and transmitter 18 are preferably positioned in or on a small housing or circuit board. A clip or other connector 24 may be used to attach the GPS device 12 to an arm band so that it may be worn by a user. Alternatively, the connector 24 may attach the GPS device to a visor or dash of an automobile or other object.

Importantly, the GPS device 12 of the first embodiment of the invention does not require a display for displaying location information or a processor and associated GPS software for determining a location of the device. Rather, the GPS receiver 16 and transmitter 18 may merely receive GPS satellite signals and transmit information relating thereto to the portable electronic device 14 as described below. This permits the use of a very small GPS device which can be easily worn by a user or attached to another object as discussed above.

The portable electronic device 14 may be a cellular telephone, PDA, portable computer, combined cellular phone/computer, radio frequency communications device, or any other known consumer or commercial electronic device. The portable electronic device 14 of the first embodiment of the invention includes a receiver 26 for wirelessly receiving the information transmitted by the GPS device 12 and a processor 28 coupled with the receiver 26 for analyzing the information.

As with the transmitter 18 of the GPS device 12, the receiver 26 is preferably a transceiver operable to both receive and transmit information. The receiver 26 either includes an antenna 30 or may be coupled with an external antenna.

The processor 28 is coupled with the receiver 26 for receiving and analyzing the information transmitted by the GPS device 12. The processor 28 preferably includes, or is coupled with, memory 32 for storing conventional GPS software applications which determine a location of the GPS device as a function of the information transmitted by the GPS device 12. The same or other memory 34 may store cartographic map data or other information and data conventionally used with GPS devices. The processor 28 may be dedicated for GPS functions only and coupled with another processor of the portable electronic device 14 or may be a dual function device that both provides GPS functions and other functions related to the portable electronic device 14 such as telephone or PDA functions.

The portable electronic device 14 may also include a display 36 for displaying information or data corresponding to the calculated location of the GPS device 12, and a user interface 38 for permitting a user to enter data and information into the processor 28. The display 36 is preferably a liquid crystal display but may use any other conventional display technology. The user interface 38 may include control buttons for operating drop-down menus or may be an alpha numeric keypad.

The transmitter 18 of the GPS device 12 and the receiver 26 of the portable electronic device 14 preferably wirelessly transmit and receive information via a short range wireless LAN using infrared, unlicensed radio, or optical transmission methods. In preferred forms, the transmitter 18 and the receiver 26 transmit and receive information using Blue-Tooth or WiFi communication protocols. BlueTooth and WiFi devices are designed to transmit short bursts or packets of data over short ranges using unlicensed high-frequency channels such as the 2.4 GHz frequency band. Such communication protocols typically establish a frequency-hopping radio link using many different frequencies at approximately 1 MHz intervals to give a high degree of immunity from interference with other transmissions.

The portable electronic device 14 may also include a transmitter 40 and antenna 42 operable to transmit location information to a remote device. The transmitter may, for example, transmit the location of the GPS device 12 to a remote base station or to another portable electronic device such as a cellular phone. The transmitter 40 may be a short range Family Radio Service (FRS) transmitter, a cellular radio transmitter, or any other conventional transmitting device.

Figure 2:
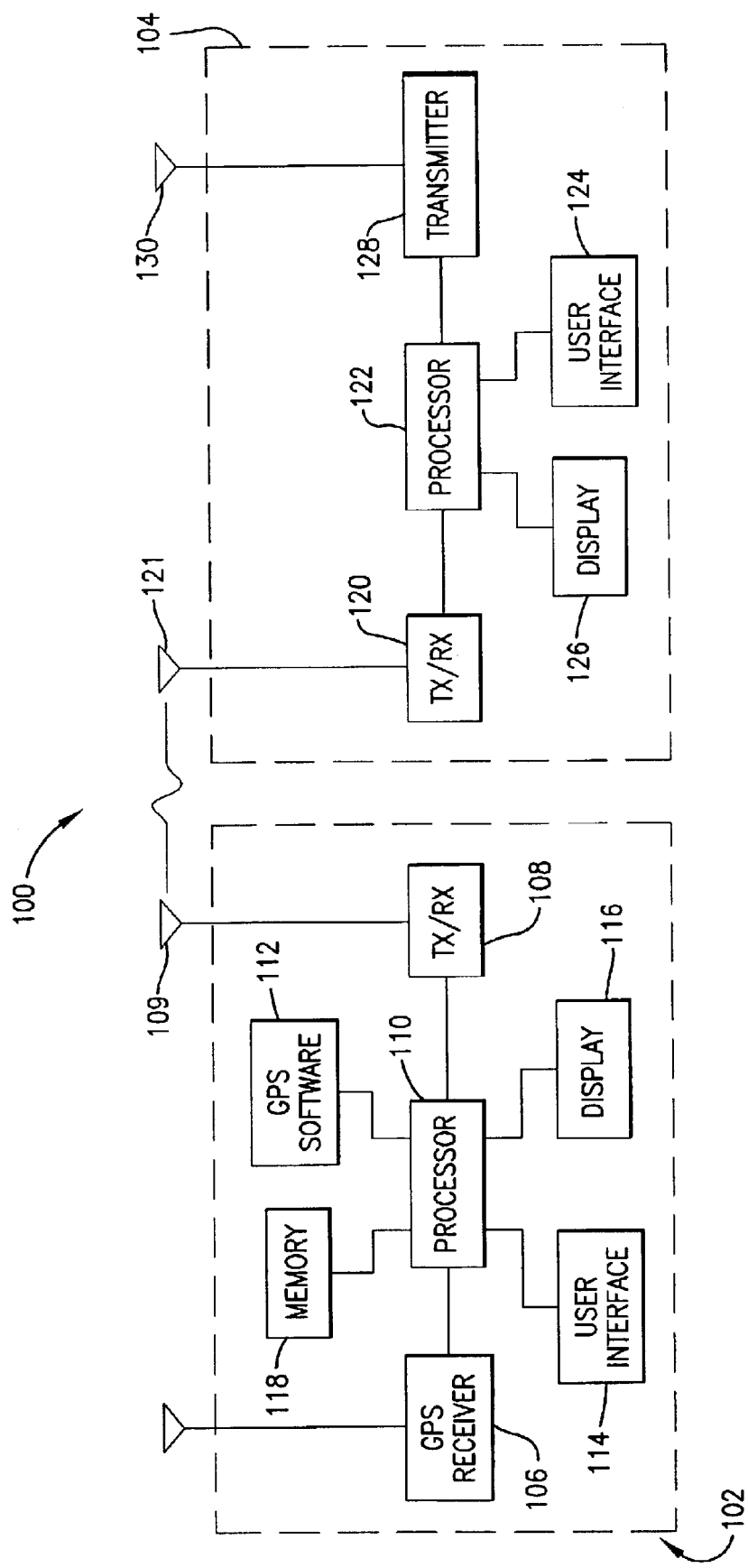
FIG. 2 is a block diagram of a navigation system constructed in accordance with a second preferred embodiment of the present invention.

FIG. 2 illustrates a navigation system 100 construed in accordance with a second embodiment of the present invention. As with the first embodiment, the navigation system 100 broadly includes a GPS device 102 that wirelessly communications with a portable electronic device 104.

In the second embodiment, the GPS device 102 includes a GPS receiver 106, transmitter 108, and antenna 109 that operate substantially the same as these same components of the first embodiment. However, in the second embodiment, the GPS device 102 also preferably includes a processor 110 and memory 112 for storing GPS software operable for analyzing the GPS satellite signals received by the GPS receiver 106, for determining a location of the GPS device 102 as a function thereof, and for generating location information corresponding to the calculated location. The processor 10 delivers the location information to the transmitter 108 for transmission to the portable electronic device 104.

The GPS device 102 may also include a user interface 114 for permitting a user to enter data and information into the processor 110 and a display 116 for displaying the calculated location of the GPS device 102. The memory 112 or other memory 118 may store cartographic map data or other useful navigational information that may be displayed on the display 116.

The portable electronic device 104 of the second embodiment is similar to the portable electronic device 14 of the first embodiment and maybe a cellular phone, PDA, portable computer, combined cellular phone/computer, radio frequency communications device, or any other known consumer or commercial electronic device. The portable electronic device 104 includes a receiver 120 and antenna 121 for wirelessly receiving information transmitted by the GPS device 102, a processor 122 coupled with the receivers 20, a user interface 124 coupled with the processor 122, and a display 126 coupled with the processor 122. The portable electronic device 104 may also include a transmitter 128 and antenna 130 operable to transmit location information to a remote base station or to another portable electronic device as described above. Importantly, the portable electronic device 104 of the second embodiment does not require GPS software and processing capabilities for determining a location of the GPS device 102. Instead, such tasks are performed by the GPS device 102 as discussed above.

As with the first embodiment, the GPS device 102 and portable electronic device 104 of the second embodiment preferably wirelessly transmit and receive information via a short range wireless LAN using infrared, unlicensed radio, or optical transmission methods. In preferred forms, the transmitter 108 and receiver 120 transmit and receive information using BlueTooth or WiFi communication protocols.

Figure 3:
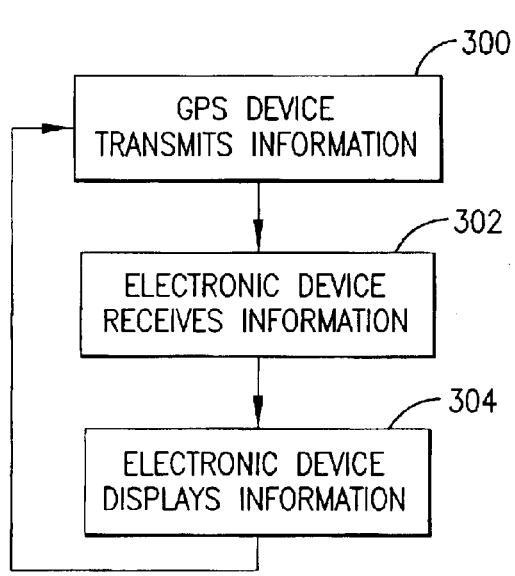
FIG. 3 is a flow diagram depicting one method of transferring location information between the components of the navigation system.

In both the first and second embodiments of the invention and other embodiments, information may be sent between the GPS device 12, 102 and the portable electronic device 14, 104 via several methods. FIG. 3 depicts the steps in one method in which the GPS device 12, 102 periodically and automatically transmits information to the portable electronic device 14, 104. Specifically, as depicted in step 300 of FIG. 3, the GPS device 12, 102 initially receives GPS satellite signals and transmits information corresponding to these received GPS satellite signals with its transceiver. The transceiver of the portable electronic device 14, 104 then receives the information as depicted in step 302. The information is then passed to the processor of the portable electronic device 14, 104 and displayed on its display as described above and as depicted in step 304. After a predetermined amount of time has elapsed, these steps are repeated when the GPS device 12, 102 transmits updated information as depicted in step 300. The time period between transmissions of the information may be fixed (for example every 30 seconds) or may be selected by a user (for example between 1 second and 5 minutes).

Figure 4:
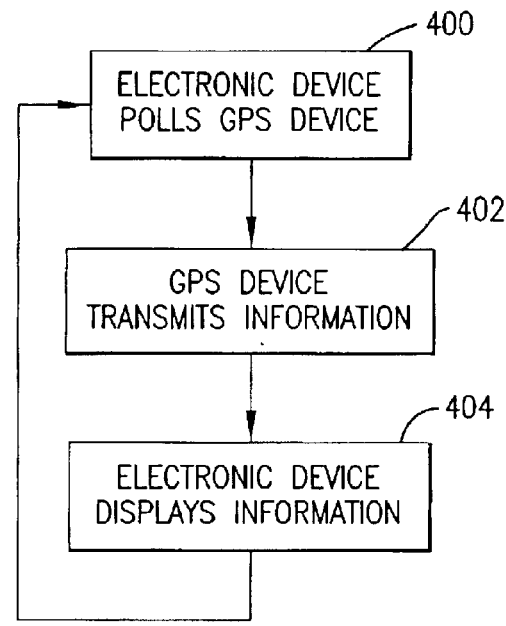
FIG. 4 is a flow diagram depicting another method of transferring location information between the components of the navigation system.

FIG. 4 depicts another method of transferring information between the GPS device 12, 102 and the portable electronic device 14, 104 in which the portable electronic device 14, 104 periodically polls the GPS device 12, 102 for the information. Specifically, as depicted in step 400 of FIG. 4, the receiver of the portable electronic device 14, 104 initially transmits a request for the most recent information to the transmitter of the GPS device 12, 102. The GPS device 12, 102 then transmits the information to the portable electronic device 14,104 as depicted in step 402. The portable electronic device 14, 104 receives the information and displays it on its display as described above and as depicted in step 404 of FIG. 4. These steps are repeated after a predetermined amount of time. As with the first transmission method described above, the time period between transmissions may be fixed or selected by a user.

Figure 5:
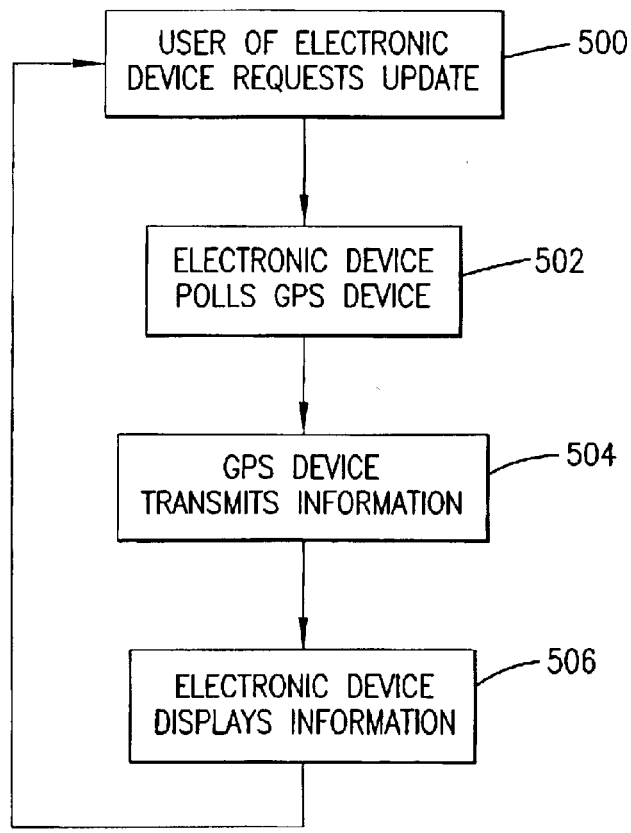
FIG. 5 is a flow diagram depicting yet another method of transferring location information between the components of the navigation system The drawing figures do not limit the present invention to the specific embodiments disclosed and described herein. The drawings are not necessarily to scale, emphasis instead being placed upon clearly illustrating the principles of the invention.

FIG. 5 depicts yet another method of transmitting information between the GPS device 12, 102 and the portable electronic device 14,104 in which a user of the portable electronic device 14, 104 requests the information. Specifically, as depicted in step 500 of FIG. 5, a user of the portable electronic device 14, 104 may enter a command into the user interface to request updated location information. The portable electronic device 14, 104 then transmits to the GPS device 12, 102 a request for such information as depicted in step 502. The GPS device 12, 102 then transmits the information to the portable electronic device 14 as depicted in step 504. The portable electronic device 14, 104 then displays the information on its display as discussed above and as depicted in step 506. At any time, the user of the portable electronic device 14, 104 may repeat these steps by once again entering a request for updated location information.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

1. A navigation system comprising:
   a GPS device consisting essentially of
   a GPS sensor operable for receiving GPS satellite signals from a plurality of GPS satellites, and
   a transmitter coupled with the GPS sensor for wirelessly transmitting information corresponding to the GPS satellite signals; and
   a cellular phone including
   a receiver operable for wirelessly receiving the information from the transmitter of the GPS device, and
   a display for displaying data corresponding to the information received by the receiver.

2. The navigation system as set forth in claim 1, wherein the GPS device is adapted to attach to a windshield of a vehicle.

3. The navigation system as set forth in claim 1, wherein the information includes location information corresponding to a location of the GPS device.

4. The navigation system as set forth in claim 3, wherein the GPS device is adapted to calculate the location of the GPS device as a function of the received satellite signals.

5. The navigation system as set forth in claim 1, the cellular phone further including a processor coupled with the receiver for calculating a location of the GPS device as a function of the information transmitted by the GPS device.

6. The navigation system as set forth in claim 1, wherein the transmitter and the receiver transmit and receive the information via short range wireless communication methods.

7. The navigation system as set forth in claim 6, wherein the transmitter and receiver are infrared devices.

8. The navigation system as set forth in claim 6, wherein the transmitter and receiver are radio frequency devices.

9. The navigation system as set forth in claim 8, wherein the transmitter and receiver transmit and receive the information using BlueTooth communication protocols.

10. The navigation system as set forth in claim 8, wherein the transmitter and receiver transmit and receive the information using WiFi communication protocols.

11. The navigation system as set forth in claim 1, wherein the cellular phone is programmed to display cartographic map data.

12. The navigation system as set forth in claim 1, wherein the cellular phone is programmed to provide navigational functions.

13. The navigation system as set forth in claim 1, wherein the GPS device automatically periodically transmits the information to the cellular phone.

14. The navigation system as set forth in claim 1, wherein the cellular phone periodically polls the GPS device for the information.

15. The navigation system as set forth in claim 1, wherein the cellular phone includes a user interface which may be operated by a user to request transmission of the information from the GPS device.

16. A navigation system comprising:
   a GPS device including a
   GPS antenna for sensing GPS satellite signals from a plurality of GPS satellites,
   a GPS receiver coupled with the GPS antenna for receiving the GPS satellite signals therefrom,
   a processor coupled with the GPS receiver for calculating a location of the GPS device as a function of the received satellite signals, for creating location information representative of the location, and for automatically communicating the information at user-defined intervals, and
   a transmitter coupled with the processor for wirelessly transmitting the location information; and
   a cellular phone including
   a first antenna operable for sensing the location information transmitted by the GPS device,
   a receiver coupled with the first antenna and operable for receiving the location information from the antenna,
   a processor coupled with the receiver for receiving the location information from the receiver,
   a transmitter coupled with the processor and a second antenna and adapted to receive the location information from the processor and wirelessly transmit the information to a remote base station, and
   a display coupled with the processor for displaying data corresponding to the location information.

17. The navigation system as set forth in claim 16, wherein the transmitter and the receiver transmit and receive the location information via short range wireless communication methods.

18. The navigation system as set forth in claim 16, wherein the transmitter and receiver transmit and receive the location information using BlueTooth communication protocols.

19. The navigation system as set forth in claim 16, wherein the transmitter and receiver transmit and receive the location information using WiFi communication protocols.

20. A method for wirelessly linking a GPS device and a cellular phone comprising the steps of:
   programming the cellular phone to enable the phone to communicate with the GPS device and to display GPS-related information;
   attaching the GPS device to a windshield of a car;
   sensing GPS satellite signals from a plurality of GPS satellites with the GPS device;
   wirelessly transmitting information corresponding to the GPS satellite signals from the GPS device to the cellular phone; and
   displaying data corresponding to the information on a display of the cellular phone.

21. The method as set forth in claim 20, further including the steps of:
   calculating a location of the GPS device as a function of the received satellite signals and creating location information representative thereof with the GPS device; and wirelessly transmitting the location information from the GPS device to the cellular phone.

22. The method as set forth in claim 20, further including the steps of:
programming the cellular phone to enable the phone to calculate a location of the GPS device as a function of the received satellite signals and to create location information representative thereof; and
calculating a location of the GPS device as a function of the received satellite signals and creating location information representative thereof with the cellular phone.

23. The method as set forth in claim 20, further including the step of automatically and periodically transmitting the information from the GPS device to the cellular phone.

24. The method as set forth in claim 20, further including the step of periodically polling the GPS device with the cellular phone to request transmission of the information.

25. The method as set forth in claim 20, further including the step of requesting transmission of the information from the GPS device with a user interface coupled with the cellular phone.

26. The navigation system as set forth in claim 16, wherein the GPS device further includes a portable housing adapted to attach to a windshield of a vehicle.

27. A navigation system comprising:
a GPS device including:
a GPS antenna for sensing GPS satellite signals from a plurality of GPS satellites,
a GPS receiver coupled with the GPS antenna for receiving the GPS satellite signals therefrom, and
a transceiver coupled with the GPS receiver for wirelessly transmitting information corresponding to the GPS satellite signals and receiving information requests; and
a cellular phone including:
a first antenna for sensing the location information transmitted by the GPS device and transmitting information,
a transceiver coupled with the first antenna and operable for receiving the location information from the antenna and transmitting location information requests,
a first processor coupled with the transceiver and adapted to communicate location information requests to the transceiver at user-defined intervals, to receive the location information from the receiver, to calculate a location of the GPS device as a function of the received satellite signals, and to create location information representative of the location,
a transmitter coupled with the first processor and a second antenna and adapted to receive the location information from the processor and wirelessly transmit the information to a remote base station,
a display coupled with the first processor for displaying data corresponding to the location information,
a user interface coupled with the first processor and that may be operated by a user to request transmission of the information from the GPS device, and
a second processor adapted to perform functions related to the cellular phone.

28. The navigation system as set forth in claim 27, wherein the GPS device further includes a portable housing adapted to attach to a windshield of a vehicle.

29. A navigation system comprising:
a GPS device including:
a GPS sensor operable for receiving GPS satellite signals from a plurality of GPS satellites,
a processor coupled with the GPS sensor for calculating the location of the GPS device as a function of the received satellite signals and for creating location information corresponding to a location of the GPS device,
a transmitter coupled with the GPS sensor for wirelessly transmitting the location information, and
a portable housing adapted to attach to a windshield of a vehicle; and
a cellular phone including:
a receiver operable for wirelessly receiving the location information from the transmitter of the GPS device, and
a display for displaying data corresponding to the information received by the receiver.

30. A navigation system comprising:
a GPS device including:
a GPS sensor operable for receiving GPS satellite signals from a plurality of GPS satellites,
a transmitter coupled with the GPS sensor for wirelessly transmitting information corresponding to the GPS satellite signals, and
a portable housing adapted to attach to a windshield of a vehicle; and
a cellular phone including:
a processor coupled with the receiver for wirelessly receiving the information from the transmitter of a function of the information transmitted by the GPS device, and
a processor coupled with the receiver for calculating a location of the GPS device as a function of the information transmitted by the GPS device, and
a display for displaying data corresponding to the location of the GPS device.

* * * * *